July 9, 1957  G. J. SCHWAB, JR  2,798,385
CHAIN SAW VISE

Filed Feb. 1, 1956  2 Sheets-Sheet 1

George J. Schwab, Jr.
INVENTOR.

BY *Clarence A. O'Brien*
*and Harvey B. Jacobson*
Attorneys

July 9, 1957 G. J. SCHWAB, JR 2,798,385
CHAIN SAW VISE
Filed Feb. 1, 1956 2 Sheets-Sheet 2
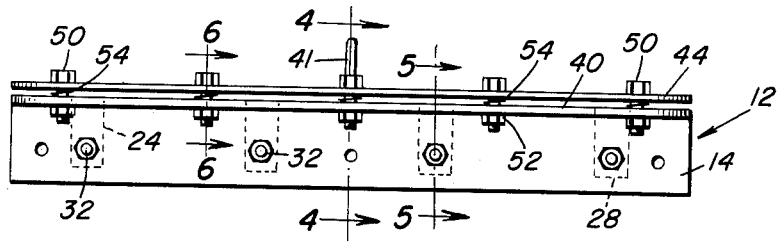
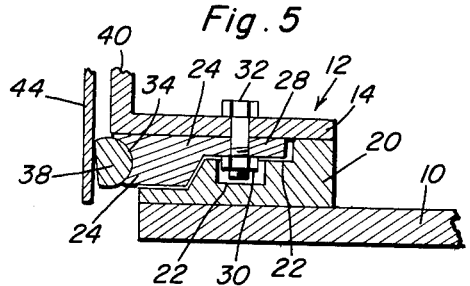
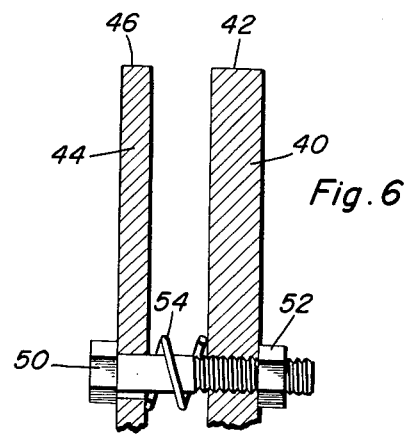
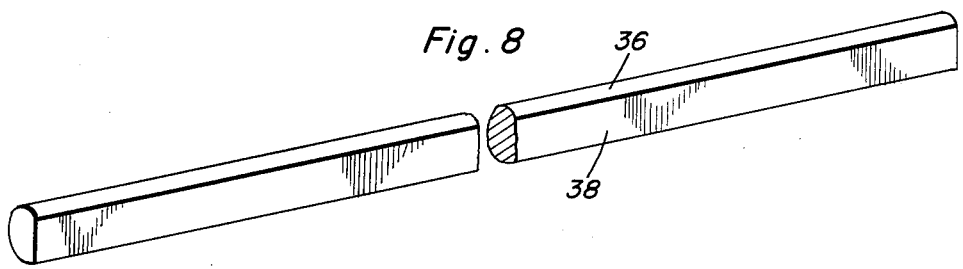
George J. Schwab, Jr.
INVENTOR.

United States Patent Office 2,798,385
Patented July 9, 1957

2,798,385

CHAIN SAW VISE

George J. Schwab, Jr., Enumclaw, Wash., assignor of one-half to Mary H. Schwab, Enumclaw, Wash.

Application February 1, 1956, Serial No. 562,829

2 Claims. (Cl. 76—78)

The present invention relates to a novel vise which is designed and constructed to be mounted on a work bench, table or equivalent stationary support and, being characterized by a pair of opposed elongate grips or jaws, constitutes a highly satisfactory holder for the components of a chain saw, making it possible for one to sharpen and otherwise recondition the saw teeth utilizing a minimum amount of time and effort.

Although patents have been issued to others engaged in this field for some reason or reasons unknown, the inventions disclosed therein have not, evidently, met with widespread adoption and use. After scanning the market for an acceptable and reliable chain saw vise and finding none available, this posed a problem and it is therefore the object of the instant endeavor to aptly solve the problem and to structurally, functionally, and otherwise improve upon prior art adaptations which have been revealed to me.

With a view toward providing a construction which effectually serves the purposes for which it is intended, a construction has been evolved and produced which, it is believed, will satisfy the manufacturing requirements and economies of manufacturers and will, what is more important, efficiently fulfill the needs of those who are called upon to take care of the often time-consuming and laborious job of handling and sharpening the teeth of endless and equivalent chain saws.

In carrying out the principles of the preferred embodiment of the invention, an angle iron is used and is bolted on the table or bench, is provided with block-like bearings which serve to accommodate a cam having a handle or lever cooperating with the bearings and also with a suitable plate which is bolted on one of the flanges of the angle iron to thus provide openable and closable gripping and holding jaws.

Other objects, features and advantages will become more readily apparent from the following description and the accompanying sheets of illustrative drawings.

In the drawings, wherein like numerals are employed to designate like parts throughout the views:

Figure 2 is a plan view of the same with the saw omitted;

Figure 3 is a section on the line 3—3 of Figure 1 looking in the direction of the arrows with the clamping jaws effective;

Figures 4, 5 and 6 are cross sections on the lines 4—4, 5—5, 6—6 of Figure 2;

Figure 7 is a perspective view of one of the afore-mentioned block-like bearings or bearing blocks; and Figure 8 is a perspective view of the elongate cam.

Figure 1:
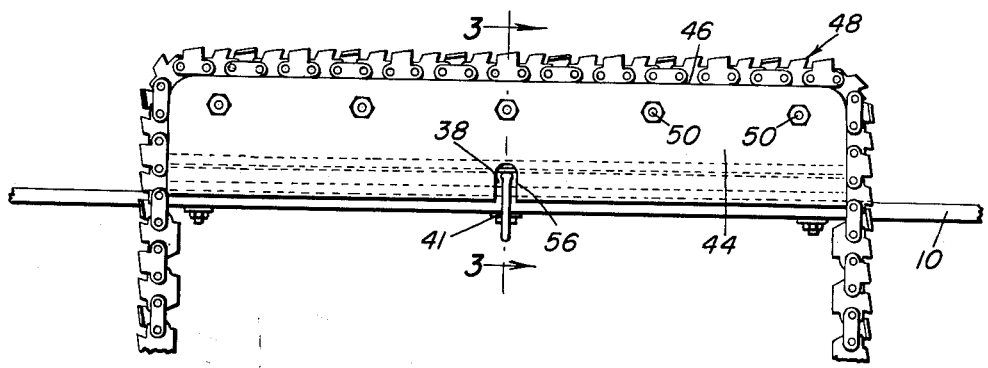
Figure 1 is an elevational view on a relatively small scale of the vise showing its construction and how the chain saw, fragmentarily shown, is used in conjunction therewith.
Figure 1:
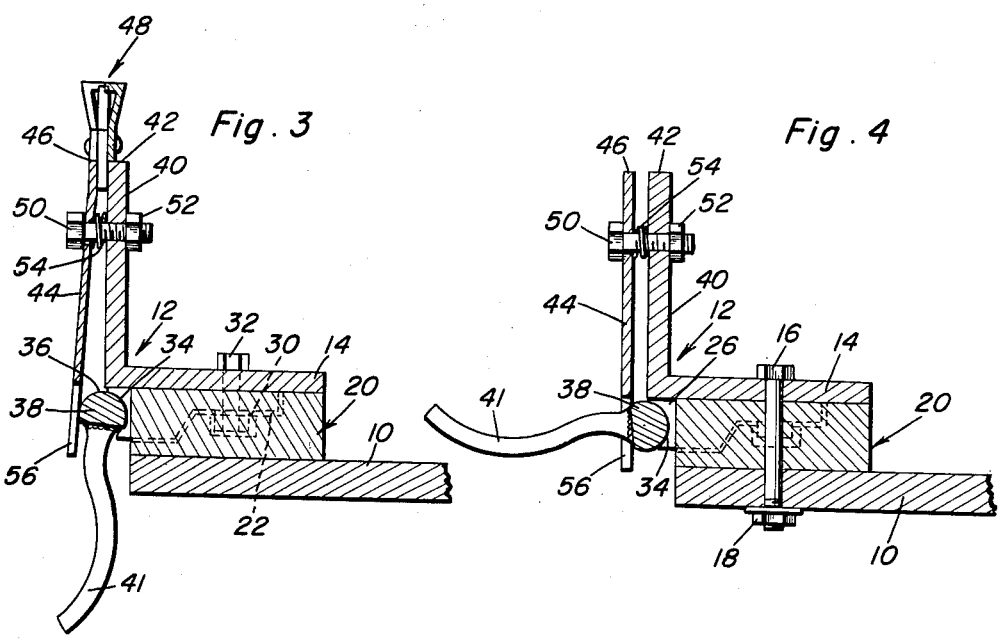
Figure 1:
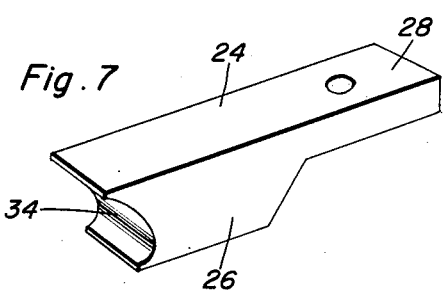

Referring now to the drawings with the aid of reference numerals and lead lines, the work bench, table or other stationary support is denoted (Figs. 1, 3, 4, and 5) by the numeral 10. One of the aforementioned primary units or members comprises an elongate angle iron 12 having a horizontal flange 14 which is bolted or otherwise secured as at 16 and 18 (Fig. 4) to the bench 10. By preference there is an elongate timber and spacing adapter 20 which is sandwiched between the flange 14 and the table and bolted by the same bolts 16. This is provided with stepped recesses (Fig. 5) at longitudinally spaced points which recesses are denoted by the numerals 22, the same being shaped to accommodate the block-like bearings or bearing brackets 24. Some four or more of these are provided than the showing made in the drawings and the body portion 26 is seated in the deeper portion of the recess 22 while the tail portion 28 is seated in the correspondingly proportioned part of the recess. The recess means is also constructed to accommodate nuts 30 on bolts 32 which extend through the flange and thus serve to clamp the bearing brackets or blocks to said flange. The left-hand end of each block has a substantially semicircular seat or groove 34 therein to accommodate the substantially semicircular convex surface 36 of the elongate bar 38. This is intended to function as a cam and is therefore referred to as an elongated cam and has a lateral lever or handle 41 intermediate its ends. Reverting to the angle iron, the vertical flange thereof is denoted by the numeral 40 and the upper edge is smooth and level and forms a straight edge 42. This flange 40 forms or provides what is conveniently referred to as the relatively fixed or stationary jaw. The movable jaw is in the form of an adjustable plate 44 which is shiftable relative to the flange 40 and also has a straight upper edge 46 which is level with the edge 42 and these edges serve to accommodate the teeth or shoulder portions of the teeth of the chain saw 48. The plate 44 is adjustably mounted in place by bolts 50 and nuts 52 which pass through the plate and flange 44 and 40, respectively, as shown in Fig. 6 in particular, there being a coiled spring 54 surrounding the bolt in each instance and interposed between the flange 40 and plate 44. The lower central portion of the plate has a clearance notch 56 for the operating handle or lever so that it may be lifted up or pushed down, as the case may be. When it is down, as shown in Fig. 3, the cam surface bearing against the bearing surface 34 and plate 44 serves to incline or spread the plate to the left and this brings about or applies the jaw clamping result in any obvious manner. When the handle of the cam is lifted up, as shown in Fig. 4, the cam action is reversed and the jaws are released.

The ends or upper corner portions of the flange 40 and plate 44 are suitably rounded at a three-quarter inch radius so that the chain can be rotated to any position without interference when the vise is in unlocked position. A vise as revealed herein has been actually constructed and is in use and has proved to be exceptionally efficient and acceptably satisfactory. The advantages of this vise over others on the market are; it is strong, reliable, efficient and otherwise constructed to perform the intended functions. It provides clamping support for a plurality of teeth and constitutes a time and energy saver. Filing and setting of saw teeth with the aid of this vise now becomes a reasonably simple and satisfactory task.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows,

1. A structure of the class described, in combination, an angle iron having horizontal and vertical flanges, means for mounting said horizontal flange atop a stationary support, bearing brackets fastened to the horizontal flange, each bearing bracket having a substantially semicircular cam contacting surface, a plate opposed to and spaced from the vertical flange and removably and adjustably bolted on said flange, the upper edges of the vertical flange and plate cooperating and providing teeth accommodating and clamping jaws, and an elongate cam interposed between a lower edge portion of the plate and the cam contacting surfaces of the cooperating brackets.

2. A structure of the class described, in combination, an angle iron having horizontal and vertical flanges, means for mounting said horizontal flange atop a stationary support, bearing brackets fastened to the horizontal flange, each bearing bracket having a substantially semicircular cam contacting surface, a plate opposed to and spaced from the vertical flange and removably and adjustably bolted on said flange, the upper edges of the vertical flange and plate cooperating and providing teeth accommodating and clamping jaws, and an elongate cam interposed between a lower edge portion of the plate and the cam contacting surfaces of the cooperating brackets, the intermediate portion of said plate having a clearance notch, the intermediate portion of said cam having a lateral lever and said lever being operable in said notch.

References Cited in the file of this patent
UNITED STATES PATENTS

| | | |
|---|---|---|
| 602,205 | Winchell | Apr. 12, 1898 |
| 723,789 | Walter | Mar. 24, 1903 |
| 932,224 | Wood | Aug. 24, 1909 |
| 1,324,594 | Huggins | Dec. 9, 1919 |
| 1,625,666 | Large | Apr. 19, 1927 |
| 2,589,165 | Toy et al. | Mar. 11, 1952 |